(12) United States Patent
Hastings et al.

(10) Patent No.: US 6,376,834 B1
(45) Date of Patent: Apr. 23, 2002

(54) MOIRE INTERFERENCE PATTERN REDUCTION FOR SCANNING OF HALF-TONED IMAGES

(75) Inventors: Brian L Hastings, Fort Collins; Dan L Dalton, Greeley, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/427,198

(22) Filed: Oct. 26, 1999

(51) Int. Cl.⁷ ............................. G06K 9/32; H04N 1/40

(52) U.S. Cl. ...................... 250/234; 250/235; 358/454

(58) Field of Search ................ 250/208.1, 237 G, 250/208.2, 234, 235, 236, 214 R; 358/533, 454, 455, 456

(56) References Cited

U.S. PATENT DOCUMENTS

| | | | | |
|---|---|---|---|---|
| 5,578,813 A | * | 11/1996 | Allen et al. | 235/462.42 |
| 5,585,620 A | * | 12/1996 | Nakamura et al. | 250/208.1 |
| 5,917,621 A | * | 6/1999 | Yushiya | 250/208.1 |
| 6,181,834 B1 | * | 1/2001 | Li et al. | 358/445 |

* cited by examiner

*Primary Examiner*—John R. Lee

(57) ABSTRACT

Moire patterns are significantly suppressed in a scanner that continuously varies its number of lines per inch. The number of dots per inch in the direction different from the relative motion between the scanner and the document is generally a fixed property of the optical sensor, but in the LPI direction the distance between consecutive lines can be made to randomly vary between a maximum distance and a minimum distance. This spatially distributes the moire effect, and prevents its accumulation into the usual recognizable two dimensional pattern.

6 Claims, 1 Drawing Sheet

MOIRE INTERFERENCE PATTERN REDUCTION FOR SCANNING OF HALF-TONED IMAGES

REFERENCE TO ISSUED PATENT

The subject matter disclosed in U.S. Pat. No. 5,578,813, entitled FREEHAND IMAGE SCANNING DEVICE WHICH COMPENSATES FOR NON-LINEAR MOVEMENT is of interest to our invention described herein, since that patent describes an exemplary environment within which our invention may be practiced. In the interest of brevity U.S. Pat. 5,578,813 is hereby incorporated herein by reference.

BACKGROUND OF THE INVENTION

Scanners are devices that view an image and then represent it as if it were a number of adjacent lines of consecutive pixel positions along a line. The optical content at each pixel location is represented by a digital value (say, four or five bits), and the scanner's output is often organized serially, as consecutive digital values delimited or grouped into collections representing the scanned lines. An important parameter in this process is the spatial density represented by consecutive digital values within a line, often expressed in dots per inch, or DPI. A similar parameter is the distance between adjacent lines, which may be termed lines per inch, or LPI. For most scanners the DPI and LPI are fixed during any given scanning operation; for certain scanners the LPI may vary in complicated ways if during scanning the LPI axis is allowed to depart from perpendicularity with the DPI axis. Sometimes firmware associated with preparing the gray scale data for use by another system re-formats the scanned results to appear as though they had been scanned at a lower resolution than actually performed by the hardware. In any event, the scanner system usually outputs pixel data that is expected to already conform, or that has been adjusted to conform, to a regular grid of pixel locations. For a variety of different light sensitive sensors, this scanning process is capable of very good performance under favorable conditions.

Leaving aside a host of performance affecting issues that stem from the nature of the light sensitive sensor, one very important issue attaches to the nature of the original image being scanned. As is well known, many images that begin as photographs are reproduced as half-tones. Under magnification the half-toning appears as a regularly spaced matrix of dots having different sizes. Upon such examination (say, with a magnifying glass) it is seen that dark dots are really no darker than light ones, but they are instead bigger. In fact, adjacent dark dots might be so large as to blend together, so that there is an absence of intervening white space. Really light dots are sufficiently small (to the point of absence, even) that they have lots of intervening white space.

Half-toning is often produced by the introduction of a screen in the optical path. The holes in the screen are apertures that produce the dots of varying size. The pitch of the screen (i.e., the number of holes per inch) determines (absent other enlargement or reduction) the spacing for the matrix of dots in the half-tone reproduction, which might be the printed image of a photograph in a newspaper or a magazine. The pitch of the screen is generally uniform in both directions. The screen used for newspaper photographs might be as coarse as eighty five lines per inch, or less, while that for an expensive magazine might be one hundred fifty lines per inch, or more.

Half-toning solves some otherwise very nasty problems in the reproduction of photographs, and is ubiquitous. Printers for a computer often imitate the half-tone process to increase the fidelity with which a regular office copier can reproduce the printer's output of an image composed of elements besides the easy-to-copy solid lines or "type" (e.g., the 100% solid go characters of a font).

Consider a laser printer. It might have an internal micro-dot resolution of 600 or 1200 DPI, which is used to create groups of larger dots of varying size. There are various known ways to take gray scale data for pixels at, say, one hundred dots per inch, and create from the micro-dots an image of larger variable size dots at, say, one hundred dots per inch. One of these process is known as "ordered dithering", and uses the "fine positions" (X and Y positions mod $_n$) of an incoming pixel to address an n by n matrix of varying threshold values. If the gray scale value of the incoming pixel is at or above the threshold a corresponding cluster of micro-dots is produced. For fields of truly all white and truly solid black, this process produces true absence of micro-dots and solid micro-dots, respectively. For the levels of gray between those extremes there will be clusters of micro-dots of variable size. It is as if the printer had its own internal screen, although in most cases the screening agent is the software driver, and not the printer itself Moire patterns are the familiar regular pattern of dark bands or spots distributed across an image containing two (or more) underlying quantization regimes, such as having been screened by two different screens of different pitch. The relative orientation of the two regimes (screens) has an influence on the shape of the Moire pattern produced. When an image is viewed through two misaligned or different screens the Moire pattern relies on a regular disturbance in image intensity to reveal itself. That is, if two cells of the screens are in good alignment the "light" for the corresponding subject matter "gets through,", as if there were only one screen; any other alignment increasingly interferes with image fidelity during transmission of the image. Now, the case that will interest us the most concerns the viewing (say, by printing) of an original unscreened image through a second screen (in the printer) after it has already been half-toned with a first screen. We can dispense with the first screen if we take into account that what impinges on the second screen is a pattern of variable size dots, separated by, or on a field of, white space. As before, the dots in a region might be so large as to blot out the white space, or the dots might be so small that the region is entirely (or nearly) white space.

Thus, if the second screen aligns completely, or temporarily aligns well in a particular region, with the half-toned dots of the image, then within the region of good alignment there are no artifacts to disturb the transmission of the image; the dots of the image produce corresponding clusters of printed micro-dots. Now, suppose that the second screen is significantly or totally misaligned with the dots of the image. If the second screen is the same screen as the first, but simply translated out of maximum alignment (but not rotated), then the entire image would appear uniformly dim by an amount corresponding to the lack of alignment, as the apparent darkness or effective size of all the dots is uniformly reduced. If the second screen has a different pitch or is rotated, then there will be periodically occurring instances of good alignment interspersed with bad alignment. In regions of poor alignment the image either: (a) begins to wash out, as consecutive smallish dots fall in the spaces between consecutive apertures of the second screen (regularly fail to meet the threshold of the ordered dither); or (b) goes solid, as consecutive largish dots bridge across consecutive apertures of the second screen (regularly exceed the threshold of the ordered dither). In case (a) small dots are removed (and medium size dot made smaller), while in case (b) medium size dots are made into larger dots. These disturbances to dot size are the visible Moire pattern.

The scanning and subsequent printing of previously reproduced images is becoming more and more prevalent. Unfortunately, this can be accompanied by two undesirable outcomes.

Simply scanning a half-toned image can cause detectable Moire pattern artifacts in the data of the gray scale values for the scanned result. They emerge along the DPI direction at a first spatial frequency that is the difference between the half-toning screen's effective pitch in that direction and the DPI of the scanner. They also emerge along the LPI direction at a second spatial frequency that is the difference between the half-toning screen's effective pitch in that direction and the LPI of the scanner. In other words, the resolution of the scanner's hardware acts as if it were a screen. Upon reflection it will be agreed it would be fair to call these "scanner induced" Moire patterns.

More noticeable than "scanner induced" Moire patterns is what happens when the scanned half-tone image is printed to a printer that handles gray scale data by creating its own half-tone presentation, as described above. The result is exactly like viewing the original (e.g., an unscreened photograph) through two different arbitrarily positioned screens. One of these screens was that used for the half-toning of the image on the document that was scanned. The other is the screening process used by the printer. Left untreated these Moire pattern artifacts are sometimes very pronounced, often to the point where the result is considered altogether unusable. It will be noted that this problem, which we may term a "printer induced" Moire pattern, is not the fault of the scanner. The scanner is more in the position of the messenger who gets the blame for bad news. After all, the location of one "screen" is in the data that was scanned, the other "screen" is in the printer, and the scanner is simply between the two.

The conventional cure for Moire artifacts is post-processing of the scanned data. This is computationally intensive, and adds considerably to the complexity of either the scanner or the environment expecting to use the data produced by the scanner. It can also reduce image resolution as a price paid for smoothing out the Moire patterns.

Consider a hand held scanning mechanism, such as the one described in the '813 patent incorporated herein above. By way of example, suitable hand held scanning mechanisms include, but are not limited to, a CapShare 910 or CapShare 920 from Hewlett-Packard Co., which includes both an HP C6300A that is the actual scanner and some software to run on a PC.) That scanner uses a small (compared to the document) window (behind which is an array of optical sensors) in contact with the document and is moved by "swiping" in any at least slightly overlapping pattern until the whole document (or the portion of interest) has been covered. The scanner has an on-board navigation mechanism to track the swiping motion, a fair amount of memory and an impressive amount of processing power. It reconstructs, through processes called rectification (to keep the DPI and LPI axes perpendicular) and stitching (to assemble adjacent swipes into lines of correctly ordered pixels), the original image(s) that were swiped and outputs the reconstruction as if the data had been scanned by, say, a flatbed scanner. The actual scanning is 300 DPI along a line by a nominal 200 LPI, which is then rectified and stitched to be 300 DPI by 300 LPI. That result is then down-sampled to produce 150 DPI by 150 LPI of gray scale data. Since the swipes can be arbitrary in shape (simply squiggly, zig-zag or even U-shaped), one end of the line of sample pixels is often moving faster than the other, and an initial or internal 200 LPI criterion for sampling is driven by the end that is moving fastest. The handhold scanner is often used on material that contains halftone images. Regardless of its motion over the document (whether mostly straight or very squiggly) minor scanner-induced Moire artifacts will often emerge from scanning half-toned material, even after it has been rectified and stitched back together. We do not say that the scanning motion has no effect on scanner-induced and printer-induced Moire patterns; it certainly can have an effect by altering the apparent relative positions of the "screens". But the scanning motion is not the root cause of Moire patterns. Flatbed scanners also have the same difficulties.

It would be desirable if there were an effective and economical way of mitigating the effects of Moire patterns in the scanning and printing of half-toned images. That is, a way of mitigating the effects of scanner-induced Moire patterns in the data from the scanner, and printer-induced Moire patterns in the printed image. It would be particularly desirable if one relatively simple technique would mitigate both effects.

SUMMARY OF THE INVENTION

Both scanner-induced and printer-induced Moire patterns are significantly suppressed in a scanner that continuously varies its LPI. DPI in the direction different from the relative motion between the scanner and the document is generally a fixed property of the optical sensor, but in the LPI direction the distance between consecutive lines can be made to randomly vary between a maximum distance and a minimum distance. This spatially distributes the Moire effect, and prevents its concentrated accumulation into the usual recognizable two dimensional pattern.

DESCRIPTION OF A PREFERRED EMBODIMENT

Figure 1:
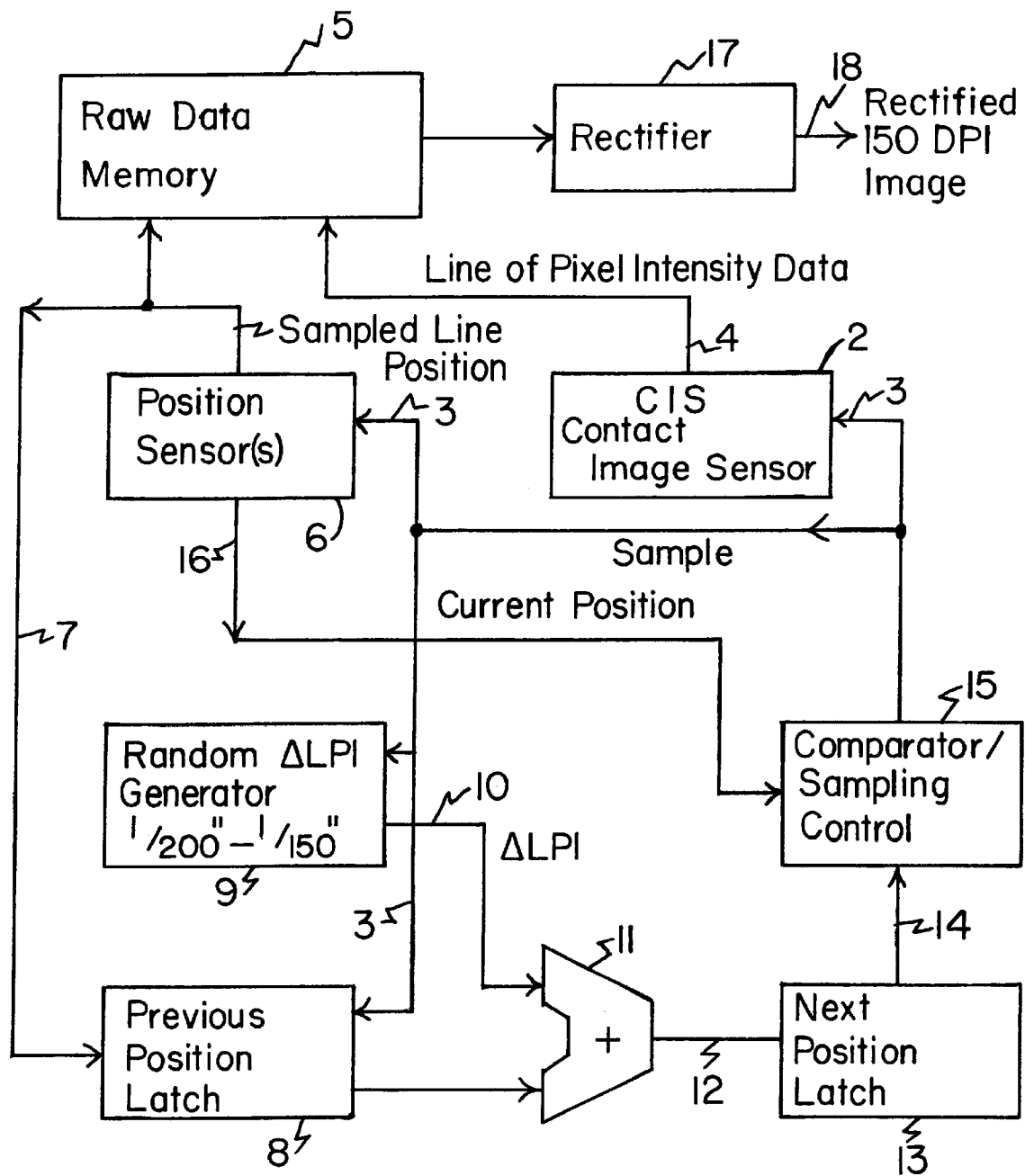
FIG. 1 is a simplified block diagram of an exemplary scanner constructed to operate in accordance with the principles of the invention.

Generally, a Moire pattern element in the printed output for scanned half-toned input is several pixels in width and several lines in height. Symbolically, we might represent such a printed Moire pattern element as the aligned lines:

(1)  OOOOO////////XXXXXX\\\\OOOOO
(2)  OOOOOO//////XXXXXXXX\\\OOOOOO
(3)  OOOOOO//////XXXXXXXX\\\OOOOOO
(4)  OOOOO////////XXXXXX\\\\OOOOO

In this example the slashes represent "output pixels" (for a laser printer they would be clusters of what we called micro-dots, produced by the ordered dither) that have their nominal (or very nearly so) values according to the image (i.e., they appear free of noticeably visible artifacts). The X's represent such output pixels having a noticeable darkening that is not a legitimate part of the actual image, and the O's are a noticeable lightening that is not a legitimate part of the actual image. The pattern of X's and O's in lines (1)–(4)

arises out of the differences in spatial frequency of the two screens. Its apparent vertical orientation is what would be produced from two screens that are generally parallel to each other and also to the DPI and LPI axes, but that are offset from each other. These conditions are, of course, a special case; the screens might experience relative rotation, which produces other geometric patterns for the shape of the visible Moire elements. Nevertheless, lines (1)–(4) will serve as a basis for illustrating the general effect of the amelioration technique we wish to describe.

Now, once the location of a DPI line along the LPI direction has been arrived at, there is no choice but to sample that: line at the DPI of the scanner. And, if the result has some scanner-induced Moire pattern elements in it along the DPI direction, well, that can't be prevented. But, we can often keep the next line from automatically exhibiting what would otherwise be the next instance of output pixels for that same Moire pattern element. By always varying the LPI of the scanner, the location of the next scanned line in the DPI direction can be expected to often fall on a location in the document where the half-tone screen for the original image does not interfere (or interferes less) with the screen being used by the printer.

As far as scanner-induced Moire patterns go, this deliberate variation in LPI produces a slight local wobble in any such Moire elements. Not only is the wobble a spatial distribution that would be helpful in even a one-to-one printing (with no printer half-toning) of non-rectified scanned pixels at the highest resolution of the scanning hardware (something that is sometimes done), but the wobble itself tends to be averaged out during the printer's half-tone simulation. So it: (a) helps in output situations where scanner-induced Moire patterns would be visible (it spreads each of them out over a larger area, so as to be less noticeable); while (b); not interfering with half-toning by the printer when printer half-toning is in use.

As for printer induced Moire patterns, a deliberate variation in scanner LPI tends to spread multi-line pattern elements apart:

(5)             OOOOOO//////XXXXXXXX\\\OOOOOO
(6)  OOOOO////////XXXXXX\\\OOOOO
(7)             OOOOOO//////XXXXXXXX\\\OOOOOO
(8)  OOOOO////////XXXXXX\\\OOOOO

To be sure, this shifts the apparent location of the original scanned document pixels by some amount in the LPI direction, and if they were to be transmitted in that form to a printer expecting a constant LPI (which is a conventional printer and of the type we plan to use), then an unrectified printed image would tend to exhibit small scale stretching and compression in the LPI direction. For example, diagonal lines nominally a few pixels thick might show a slight wavy fattening and thinning. However, this is not to say that pixel information will necessarily be out of place. For printer half-toning, the ordered dither or other screening mechanism in the printer can be expected to combine adjacent scanner pixels as part of its creation of printer-screened dots: The original information is still there, slightly misplaced in the LPI direction, and with many lines missing most or all of their Moire artifacts. The printer's half-toning produced by combining the adjacent but displaced scanner pixels will create an image that is slightly out of focus, but that is otherwise accurate.

In the case where a hand held or other scanner has already rectified a varied LPI image before sending it to the printer, the situation with respect to out-of-place scanner produced pixels is as it always was anyway, in that the rectification process never expects constant LPI. Furthermore, rectification is not screening; it is essentially a preservation of information, and does not throw information away. It can do a good job of restoring scanner-produced pixels to their nominal would-have-been locations without the loss of detail that appeals as de-focusing in the non-rectified case of the previous paragraph. But moving the scanned pixels to their would-have-been locations does not entirely compensate for the fact that the actual and would-have-been sampled locations respond differently to the presence of the screen that produced the half-tone dots being scanned. The rectification process interpolates pixel values without any knowledge of an underlying spatial frequency for the half-tone dots. The variation in pixel intensity that results is now an intermixed quantity that disturbs the spatial frequency of the half-toning by not preserving its intensity variations separately during the averaging that is the heart of the interpolation process for rectification. That is, image content can "swamp" the variations at the real half-tone spatial frequency. So the interpolation can be expected to disturb the Moire pattern in a non-regular way, based on both the change in LPI and local image content. That is what produces the spatial dislocation and smoothing in otherwise regular Moire pattern elements, spreading them out to appear less pronounced. It is as if the screen that produced the half-tone dots were in motion, and slightly out of focus, too.

It will be appreciated that changing the position of the original image by one half-tone cycle will cause a spatial displacement of one complete cycle in the Moire pattern. Now, the same thing happens if the half-toned image does not really move but the apparent location of the screen moves, which of course, is what happens when the LPI is varied. Since LPI is commensurate with most screens used to produce half-toned images, the effect of varying LPI can be pronounced. It is of interest to decide just how much variation in LPI is desirable. DPI in the other scanned axis is, of course, fixed, and we'll have to live with it. All things being equal, higher is better.)

The most desirable case would be for the variation in LPI to be based on knowing the spatial frequency (in dots per inch) of the half-toning to be scanned. Suppose that each dot was sampled exactly once, and that at each sample an intensity value is produced that represents dot size, assuming that all ink is uniformly dark (despite dot size) and that the paper is all white. In principle, this data has all the information needed to reconstruct the image, including production of any Moire patterns arising from the screen in a printer that prints the scanned image. So, if we vary the LPI by ±50% of the nominal center-to-center spacing of the half-tone dots, we can maximally disturb (and thereby disperse) the Moire pattern. However, even if the variation is less than ±50%, it is still efficacious, although it may require multiple lines to achieve one cycle of disturbance in the Moire pattern. This fact allows us to pick a variation in the line-to-line sampling distance (i.e., along the LPI direction) that will effectively disturb the Moire patterns for a wide range of halftone screen sizes.

An example is in order. Suppose we are to scan a photograph that was printed as a 150 DPI half-tone. To obtain maximal disturbance of the Moire pattern we should like to vary a 150 LPI sampling rate by $\pm \frac{1}{300}$ inch. That is, the line to line spacing between two consecutive lines would vary between $\pm \frac{1}{300}$ inch and $\frac{3}{300} = \frac{1}{100}$ inch. This variation could be regular amounts from line to line, or it could be random. Random is preferred, since any regularity in the variation has the potential for manifesting itself as a regularly (and therefore recognizable) disturbed Moire pattern.

If this amount of sample variation were used for a one hundred line per inch screened half-tone instead, then it would still produce a desirable effect, although multiple lines might be needed to realize it.

Practical concerns in any particular system may force choices and compromises. Suppose the screen is 150 DPI and the image sensor can't sample fast enough (300 LPI) unless the velocity is reduced. First, it's okay to do the best you can. Even if the variation in LPI does not reach a full 50% it is still effective. Second, in the case of a hand held scanner it is possible to educate the user to go slower over screened material. (300 LPI is 3000 samples per second if the sensor is passing the paper at ten inches per second. If 3000 samples per second is too high for the hardware—or for its accompanying arithmetic—then five inches per second is only half as fast, and might allow 300 LPI.) Another set of concerns emerges if the half-tone DPI is small, say 50 DPI. Suppose the rectification process is aimed at producing 150 DPI output, and expects nominally 200 LPI raw data. If now it is asked to take $\frac{1}{50}$ inch plus one half of $\frac{1}{50}$ inch ($\frac{3}{100}$) as the possible distance apart, it may need much more precision than before, raising the question of whether or not it is worth designing a new part (in the hand-held scanner the rectifier is big chunk of an IC). As before, a partial solution is still partially effective, so the answer might be "no", although we note that there is in principle, no reason why it cannot be done, nor is it impractical from an engineering or performance standpoint.

From the above we offer the following heuristic: For scanner hardware that is tuned to operate at a nominal 200 LPI and that includes a rectifier, 85 to 150 DPI screens can have effective Moire pattern suppression if the line to line distance (values for LPI) varies from $\frac{1}{200}$ inch to $\frac{1}{300}$ inch (200 LPI to 150 LPI), which is by $\frac{4}{600} - \frac{3}{600} = \frac{1}{600}$ inch Now, the $\frac{1}{600}$ inch is not the sole value of variation; it is the limit. There is a family of variations, of which $\frac{1}{300}$ inch is the largest. It is reasonable to assume that there might be five to ten members of this family, which raises the issue of whether or not a particular scanner can sample at locations positioned with resolutions well below fractions of one thousandth of an inch. For mechanical systems this could be quite a challenge. However, the hand-held scanner uses an optical navigation technique that allows that sort of resolution. Incremental position information is used to find velocity, which owing to the masses involved, cannot change very fast. This allows distances to be accurately delimited as time intervals, which can be measured and acted upon with far more than the required precision. So, although the block diagram we are about to investigate talks in terms of a "random delta distance" added to a nominal line to line spacing, it will be appreciated that, while such a description is conceptually accurate, when implemented in the environment of the '813 patent it is a velocity-dependent variable time interval that is at work to produce the family of fractions of $\frac{1}{600}$ of an inch by which the 200 LPI is randomly varied.

Refer now to FIG. 1, wherein is depicted a simplified block diagram 1 of a generic scanner adapted to incorporate variable LPI. The scanner has an image sensor 2, which may be a CIS (Contact Image Sensor) of the color or gray scale variety, with a resolution of perhaps 300 DPI. These days a CIS can have its own on-board digitizing, and in response to a SAMPLE signal such a CIS will produce digitized data for an entire line of sampled image pixels, represented here by line 4. That data goes into a RAW DATA MEMORY 5, although it is accompanied by corresponding position data on line 7 obtained from POSITION SENSOR(S) 6, also in response to the occurrence of the SAMPLE signal 3.

The data accumulated in the RAW DATA MEMORY 5 are sent to a RECTIFIER 17, from which they emerge on line 18 as, in this example, pixel values for a 150 DPI image.

SAMPLE signal 3 also goes to a RANDOM ΔLPI GENERATOR 9, whose output is a pseudo-random number scaled to represent fractions of the distance $\frac{1}{600}^{th}$ inch.(the aforementioned change between 200 LPI and 150 LPI). The output value ΔLPI 10 is applied as one input to an adder 11 whose other input is a latched version of value 7, which is the position of the previously sampled line. A PREVIOUS POSITION LATCH 8 captures value 7 in response to the SAMPLE signal 3, and applies the latched value to adder 11. The output 12 of the adder 11 is thus the next position at which a sample should be taken. That position value is latched into a NEXT POSITION LATCH 13, whose output 14 is applied to a COMPARATOR/SAMPLE CONTROLLER 15. It receives current position information 16 from POSITION SENSOR(S) 6. When the current position along the LPI axis matches what is in the NEXT POSITION LATCH 13 another instance of the SAMPLE signal 3 is issued, and the process continues.

We claim:

1. A method of reducing moire pattern appearance in the collection of pixels produced by scanning a half-toned image, the method comprising the steps of:

(a) quantizing into consecutive pixel values a first portion of an image lying along a first axis, the quantizing being at a fixed resolution of a constant number of pixels per unit length, (b) shifting the location of the first axis by a selected amount;

(c) subsequent to step (b), quantizing into consecutive pixel values a second portion of an image lying along the shifted first axis, the quantizing being at a fixed resolution of a constant number of pixels per unit length;

(d) subsequent to step (c), varying the selected amount; and then (e) repeating steps (b), (c) and (d).

2. A method as in claim 1 wherein step (d) comprises periodic increases and decreases in the selected amount.

3. A method as in claim 1 wherein step (d) comprises pseudo-random increases and decreases in the selected amount.

4. A method as in claim 1 wherein the shifting step (b) permits a rotation, and further comprising step (f) of rectifying the quantized consecutive pixel values to lie upon a pixel grid of regular intervals.

5. A method as in claim 4 wherein step (d) comprises periodic increases and decreases in the selected amount.

6. A method as in claim 4 wherein step (d) comprises pseudo-random increases and decreases in the selected amount.

* * * * *